US012596064B2

(12) United States Patent
Werner

(10) Patent No.: US 12,596,064 B2
(45) Date of Patent: Apr. 7, 2026

(54) DYNAMIC 3D LIGHT SCATTERING PARTICLE SIZE DISTRIBUTION WITH OFFSET POLARIZATION BEAMS

(71) Applicant: SYMPATEC GMBH, Clausthal-Zellerfeld (DE)

(72) Inventor: Daniel Werner, Goslar (DE)

(73) Assignee: SYMPATEC GMBH, Clausthal-Zellerfeld (DE)

( * ) Notice: Subject to any disclaimer, the term of this patent is extended or adjusted under 35 U.S.C. 154(b) by 298 days.

(21) Appl. No.: 18/345,610

(22) Filed: Jun. 30, 2023

(65) Prior Publication Data

US 2024/0019350 A1 Jan. 18, 2024

(30) Foreign Application Priority Data

Jul. 15, 2022 (EP) .................................... 22185110

(51) Int. Cl.
*G01N 15/02* (2024.01)
*G01N 15/0205* (2024.01)

(52) U.S. Cl.
CPC . *G01N 15/0211* (2013.01); *G01N 2015/0222* (2013.01)

(58) Field of Classification Search
CPC ....... G01N 15/0211; G01N 2015/0222; G01N 2015/0053; G01N 15/0205; G01N 21/01; G01N 21/47; G01N 2021/4709; G01N 2021/4792
See application file for complete search history.

(56) References Cited

U.S. PATENT DOCUMENTS

| | | | |
|---|---|---|---|
| 7,782,459 B2 | 8/2010 | Holve | |
| 2002/0180972 A1 | 12/2002 | Ansari | |
| 2014/0132943 A1 | 5/2014 | Chou | |

FOREIGN PATENT DOCUMENTS

| | | | | |
|---|---|---|---|---|
| WO | WO-0140764 A2 * | 6/2001 | ............. | G01N 15/14 |
| WO | 2021/155361 A1 | 8/2021 | | |

* cited by examiner

*Primary Examiner* — Rebecca C Bryant
(74) *Attorney, Agent, or Firm* — WCF IP

(57) ABSTRACT

A dynamic 3D light scattering particle size distribution measurement device includes a polarization splitter for generating an s laser beam with perpendicular polarization and a p laser beam with parallel polarization that travels parallel to and spaced apart from the s laser beam. A lens is used to focus the s laser beam and the p laser beam onto a common focus area inside a sample holder holding a sample whose particle size is to be measured. An s light intensity detector measures a time-resolved s light intensity from s backscattered light from the focus area. An s-polarisation filter allows perpendicularly polarized light to pass, resulting in s measuring light, and includes a light detector for time-resolved intensity measurements of the s measuring light. A p light intensity detector measures a time-resolved p light intensity detects p backscattered light from the focus area, and includes a p polarization filter that allows parallel polarized light to pass. A light detector provides for time-resolved intensity measurement of the p measuring light, and an evaluation unit automatically calculates the particle size distribution from the time-resolved p light intensity and the time-resolved s light intensity.

17 Claims, 3 Drawing Sheets

DYNAMIC 3D LIGHT SCATTERING PARTICLE SIZE DISTRIBUTION WITH OFFSET POLARIZATION BEAMS

FIELD OF THE INVENTION

The invention relates to a dynamic 3D light scattering particle size distribution measuring device. According to a second aspect, the invention relates to a method for determining a particle size distribution of a sample.

BACKGROUND

Dynamic 3D light scattering particle size distribution measurement is based on the scattering of coherent laser light by the particles in the sample. The particles show the Brownian motion that reduces with increasing particle size. The intensity of the scattered laser light fluctuates due to the movement of the particles. The smaller the particles, the more the intensity fluctuates. The smaller the particles, the quicker the auto-correlation function of the intensity decreases.

However, an increase in particle concentration results in multiple scattering, which effects an increased fluctuation in intensity of the scattered laser light. As a result, too small an average particle size is measured.

To avoid this problem, the particle size distribution is measured using samples with a high particle concentration by first diluting the sample. The particle size distribution is then measured on the diluted sample. For the particle size distribution measured in this way to correspond to the actual particle size distribution, it must be ensured that the liquid used for dilution does not alter the particle size distribution. Ensuring this has been proven to be complex and problematic.

It is known to split the laser beam into two partial beams and to superposition them in a superposition area of the sample. The fluctuations in intensity of the scattered light of both partial beams from the superposition area are recorded at an angle greater than 0° to less than 160° and the cross-correlation function is calculated. The particle size distribution is then calculated from the decay of the cross-correlation function. Given that the occurrence of multiple scattering is a purely stochastic process, its influence is eliminated by calculating the cross-correlation function.

The disadvantage of this process is that splitting the laser beam and the weakening of the partial beams in the sample means that only a small part of the incident light intensity is available for measuring the intensity of the scattered light. As a result, the signal-to-noise ratio is comparatively poor when known laser light sources are used. In this context, signal refers to the maximum cross-correlation amplitude. In current 3D cross-correlation methods, it is theoretically only 25% (practically approximately 20%) of a possible 100%, i.e. only a quarter of the auto-correlation signal. The more turbid the measured sample, the lower the correlation signal to be measured (correlation amplitude) due to increased proportions of multiply scattered light. The reason for the low cross-correlation amplitude of 25% is lateral scattering originating from a laser beam in the other detector and vice-versa. The two laser beams and detectors are labelled A and B. Then, when adjustment is optimal, only scattered light components from laser A to detector A and laser B to detector B can correlate with each other. The scatter vectors A-A and B-B are identical. However, scattered light from laser A does reach detector B and from laser B to detector A. The scatter vectors A-B and B-A are, however, not the same and are therefore not correlatable. This lateral scattering or interference scattered light acts on the cross-correlation signal in the same way as multiply scattered light. In order to achieve the maximum signal strength, comparable to auto correlation, the two scattered light measurements (A-A and B-B) would have to separated from each other.

SUMMARY

The invention aims to improve dynamic 3D light scattering particle size distribution measurement.

The invention solves the problem by way of a dynamic 3D light scattering particle size distribution measurement device with (a) a laser light source for emitting a laser beam, (b) a polarization splitter for generating (i) an s laser beam with perpendicular polarization and (ii) a p laser beam with parallel polarization that travels parallel to the s laser beam and is spaced apart from the s laser beam by a beam spacing other than zero, (c) a sample holder for holding a sample whose particle size distribution is to be measured, (d) a lens that serves to focus the s laser beam and the p laser beam onto a common focus area inside the sample holder, (e) an s light intensity detector for measuring a time-resolved s light intensity, wherein the s light intensity detector (i) is arranged to detect an s backscattered laser beam from backscattered light of the s laser beam from the focus area, (ii) comprises an s polarization filter that allows perpendicularly polarized light to pass, resulting in s measuring light and (iii) a light detector for the time-resolved intensity measurement of the s measuring light, (f) a p light intensity detector for measuring a time-resolved p light intensity, wherein the p light intensity detector (i) is arranged to detect a p backscattered laser beam from backscattered light of the p laser beam from the focus area, (ii) comprises a p polarization filter that allows parallel polarized light to pass and (iii) a light detector for the time-resolved intensity measurement of the p measuring light, and (g) an evaluation unit that is configured to automatically calculate the particle size distribution from the time-resolved p light intensity and the time-resolved s light intensity.

According to a second aspect, the invention solves the problem by way of a method for determining a particle size distribution of a sample, comprising the steps (a) emitting a laser beam by means of a laser, (b) generating (i) an s laser beam with perpendicular polarization and (ii) a p laser beam with parallel polarization, which travels parallel to the s laser beam and is spaced apart from the s laser beam by a beam spacing other than zero, from the laser beam by means of a polarization splitter, (c) focusing the s laser beam and the p laser beam on a common focus area within the sample, (d) polarization filtering of light backscattered from the focus area at a backscattering angle by means of an s polarization filter, so that only s-polarized light passes, resulting in an s backscattered light beam, (e) measuring a time-resolved s light intensity of the s backscattered light beam, (f) polarization filtering of light backscattered from the focus area at a backscattering angle by means of a p polarization filter, so that only p-polarized light passes, resulting in a p backscattered light beam, (g) measuring a time-resolved p light intensity of the p backscattered light beam and (h) calculating the particle size distribution from the time-resolved p light intensity and the time-resolved s light intensity.

The solution according to the invention is advantageous because the effect of multiple scattering can generally be suppressed more effectively than with known methods. This usually increases the reproducibility of the measurement results. In other words, with the method according to the invention, the measurement results generally scatter less than with methods according to the prior art.

It is also advantageous that an improved signal-to-noise ratio can usually be achieved in comparison with known methods. This can be used to reduce the measuring time and/or to achieve a lower measurement uncertainty.

It is also beneficial that the method according to the invention allows for measurements on samples with a particle concentration that, with known methods, require dilution to obtain reliable measurement results. This significantly simplifies the measurement produce whilst simultaneously reducing measurement uncertainty.

Within the scope of the present description, the feature that backscattered light is detected is understood to mean that, in particular, the backscatter angle is greater than 165°. The backscatter angle is preferably greater than 170°, especially preferably greater than 173°. The backscatter angle θ is the angle between the vector of the non-scattered light of the s laser beam and the vector of the s backscattered light beam. Therefore, the backscatter angle can theoretically be at most 180°. The detection of backscattered light favors the suppression of multiple scattering, namely by way of short optical paths in the sample, and the detection of fine particles when compared with the detection of forward-scattered light, which is measured, for example, at an angle of up to 90°.

The s backscattered light beam and the p backscattered light beam are detected at different locations in order to calculate the cross correlation at high accuracy. The different locations are not collinearly behind one another. It is advantageous when the s backscattered light beam and the p backscattered light beam are detected at the same time, i.e. not after one another. In particular, the areas in which the detectors detect the backscattered light beam are located at different locations for each backscattered light beam.

The cross correlation is, for example, described in DIN ISO 22412. In particular, the cross correlation is a 3D cross correlation.

The 3D light scattering particle size distribution measurement device will usually be a homodyne system.

The laser light source is understood particularly to mean a source of coherent light, the coherence length of which corresponds at least to the length, particularly at least 1.5 times the length, of the light path from the light source to the sample. If the two lengths of the light paths for the two light intensity detectors differ, the greater length is used.

The sample holder is understood particularly to mean a device that is designed to reversibly hold a receptacle for a sample to be measured.

The polarization information, i.e. that polarization is perpendicular or parallel, refers to a coordinate system that can be set as desired but is identical for both laser beams. In other words, it is crucial that the two laser beams are polarized orthogonally to each other. The only decisive factor is that the two polarizations are perpendicular to each other. The perpendicular polarization could also be referred to as vertical or first polarization. The parallel polarization could also be referred to as horizontal or second polarization.

The s backscattered light beam is understood to mean a beam of backscattered light of the s light beam that can, but does not necessarily have to, have an s polarization itself. The only decisive factor is that the corresponding light is the result of scattering from light of the s light beam. Since this usually involves elastic scattering on particles, the polarization of the scattered light corresponds to that of the incident light beam. Only in the case of strongly anisotropic particles can depolarization, rotation of polarization, occur in the scattered light.

The evaluation unit is understood to mean a device that automatically performs the cross-correlation function from the measured light intensities. The evaluation unit can therefore also be referred to as a correlator.

The focus area is understood as the area in which the s laser beam and the p laser beam superposition. It may refer to the focus in the sense of geometrical optics, i.e. the area in which the imaginary light beams are bundled by the lens, but this is not necessary. It is possible that the focus area and the focus overlap or are disjoint from each other. The only decisive factor is that the light that reaches the light intensity detectors originates from the area in which the two laser beams superposition. Ideally, the focus areas, or rather the beam waists of the two laser beams, overlap and form a collective scattering volume. Scattered light signals originating from particles within the common overlap area (volume) can be correlated and contribute to the calculation of the particle size distribution.

Particle size distribution is understood particularly to mean any function from which it is possible to derive the proportion (in terms of number, volume or mass) of particles within a specific particle size interval with respect to all particles.

The calculation of the particle size distribution from the time-resolved p light intensity and the time-resolved s light intensity preferably involves a calculation of the cross-correlation of the two light intensities.

According to a preferred embodiment, the s light intensity detector and the p light intensity detector are arranged in such a way that the backscattered light beams from the focus area pass through the lens to the light intensity detectors. This ensures that the light detected by the light intensity detectors always originates from the focus area. This eliminates the need for the adjustment of otherwise necessary optical components to feed the backscattered light beams to the light intensity detectors.

The beam spacing is preferably at least 0.5 mm, in particular at least 1 mm. It is also beneficial if the beam spacing is at most 20 mm, particularly at most 10 mm, particularly preferably at most 7 mm. As a result, it is comparatively easy to direct the backscattered light beams onto the light intensity detectors.

It is beneficial if a backscattered beam spacing of the s backscattered light beam from the p backscattered light beam differs from the beam spacing by at most 30%, in particular by at most 15%.

Preferably, the 3D light scattering particle size distribution measurement device has a lens adjustment device for adjusting the lens relative to the polarization splitter. In particular, the lens adjustment device is designed to displace the lens in the direction of light propagation with which the s laser beam and the p laser beam strike the lens.

According to a preferred embodiment, the laser light source is designed to emit a laser beam with a beam propagation ratio $M^2$, so that $M^2 \leq 1.2$, preferably $M^2 < 1.15$. This can be achieved, for example, by the laser light source comprising a helium neon laser. Alternatively, the laser light source may comprise a diode laser and an optical fiber. In this case, the optical fiber is preferably a single-mode fiber. It is possible that the diode laser emits a primary laser beam for which $M^2 \geq 1.2$, in particular $M^2 \geq 1.1$, applies. The optical fiber is preferably designed to reduce the beam propagation ratio $M^2$, so that $M^2 \leq 1.2$, preferably $M^2 \leq 1.15$, applies for the laser beam leaving the optical fiber.

Preferably, the polarization splitter is a polarization beam splitter with an optical axis and generates two parallel laser beams that are orthogonally polarized to each other, namely the s laser beam and the p laser beam. Such a polarization beam splitter always generates laser beams that run parallel to each other, so that an adjustment, by way of which this parallelism would have to be otherwise ensured, is not necessary.

It is especially beneficial if the laser light source emits unpolarized or circular polarized laser light.

It is beneficial if the optical fibers comprise an optical fiber input, which is configured to couple the laser beam to the laser beam source, and an optical fiber outlet. Preferably, the 3D light scattering particle size distribution measurement device has an optical fiber adjustment device for adjusting the optical fiber output relative to the polarization splitter. As a result, the laser beam emitted by the laser light source can be oriented precisely onto the polarization splitter.

For example, the polarization splitter is permanently mounted on a carrier. In this case, the optical fiber adjustment device is designed to adjust the optical fiber output relative to said carrier.

According to a preferred embodiment, the sample holder is designed to hold a sample with a diameter of at least 7 mm, especially at least 9 mm. According to a preferred embodiment, the sample holder is designed to hold a cuvette with a diameter of at least 7 mm, especially at least 9 mm. Preferably, the diameter of the sample, particularly of the cuvette, is smaller than 50 mm. It is an advantage of the invention that the light only has to cover a short distance in the sample, so that the loss of light intensity is small and the signal-to-noise ratio is correspondingly greater.

It is beneficial if a sample container is arranged in the sample holder. Preferably, the sample holder is arranged in such a way that the focus area is at a distance of at most 1 mm from an inner side of the sample container of the sample. In this case, the light need only cover a short distance in the sample, which leads to a comparatively low loss of light intensity and little multiply scattered light.

There is preferably a suspension in the sample container, the opacity of which corresponds at least to a polystyrene latex suspension with 0.1 percent by volume, particularly at least 0.2 percent by volume, of 100 nm polystyrene latex particles.

DESCRIPTION OF THE DRAWINGS

In the following, the invention will be explained in more detail with the aid of the accompanying drawings. They show.

DETAILED DESCRIPTION

Figure 1:
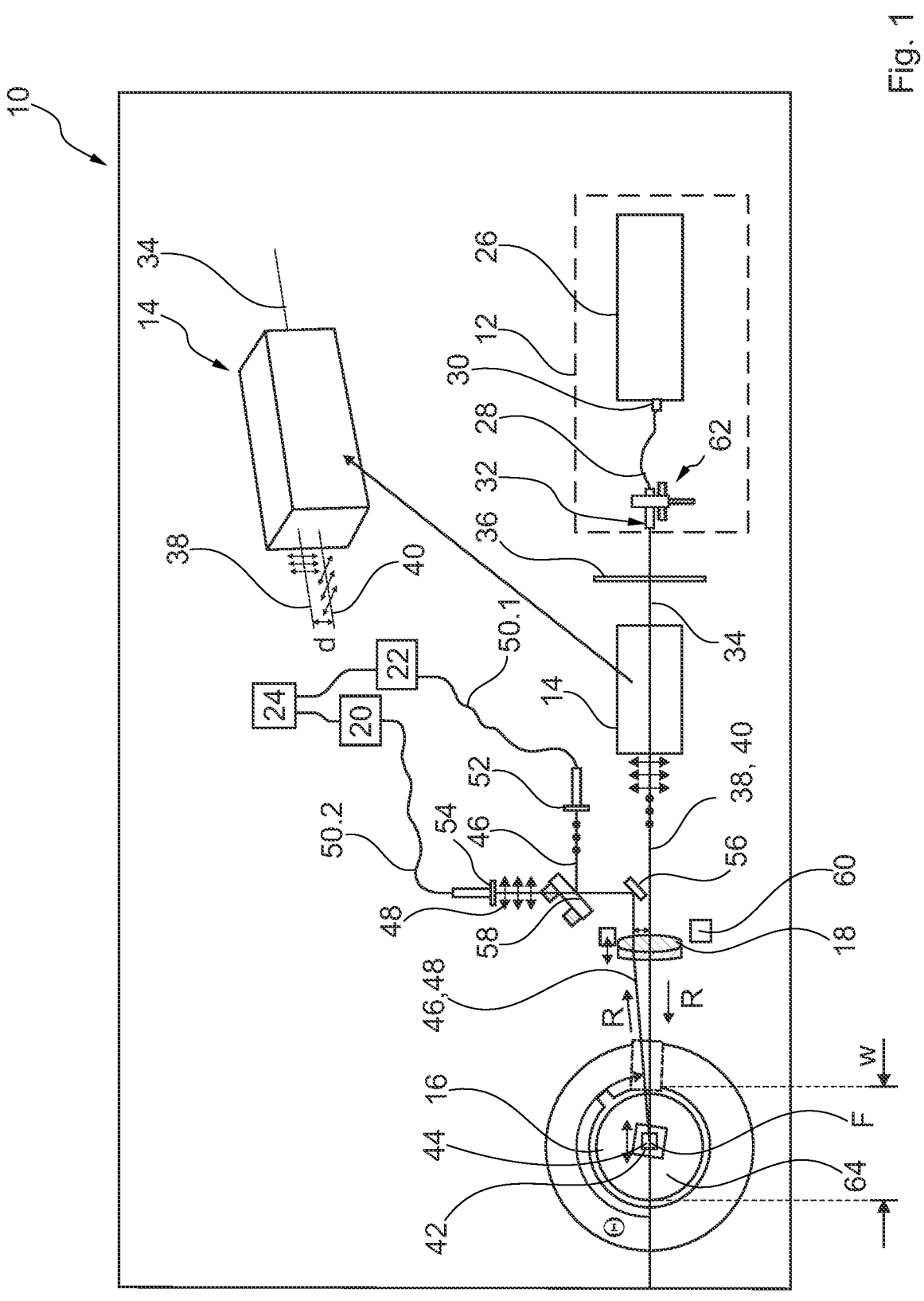
FIG. 1 a schematic view of a 3D light scattering particle size distribution measurement device according to the invention, FIGS. 2a-b in partial FIG. 2a, the measurement results on a sample with a method according to the prior art and in partial FIG. 2b, the measurement results on the same sample with a method according to the invention, and FIGS. 3a-b in the partial FIG. 3a, the cross-correlation curves of propofol (concentration: 10 mg/ml), on the one hand measured undiluted with the method according to the invention and on the other hand measured with a method according to the prior art following a dilution of 1:100 and in the partial FIG. 3b, the cross-correlation curves during a measurement on 100 nm polystyrene latex particles (concentration: 1% volume by weight), measured on the one hand with the method according to the invention and measured on the other hand with a method according to the prior art.

FIG. 1 shows a schematic view of a 3D light scattering particle size distribution measurement device 10 according to the invention with a laser light source 12, a polarization splitter 14, a sample holder 16, a lens 18, a p light intensity detector, an s light intensity detector 22 and an evaluation unit 24, which is connected to the light intensity detectors 20, 22.

In the present case, the laser light source 12 comprises a laser 26 and an optical fiber 28, which is coupled via its optical fiber input 30 with the laser 26. A laser beam 34 is emitted from an optical fiber output 32.

The laser beam 34 falls on the polarization splitter 14. It is possible, but not necessary, that the laser beam 34 passes through a laser intensity adjustment device 36 before it hits the polarization splitter 14. The polarization splitter generates an s laser beam 38 and a p laser beam 40, which travels parallel to the s laser beam 38 and has a beam spacing d from the latter. The s laser beam 38 has an s polarization, the p laser beam a p polarization.

The s laser beam 38 and the p laser beam 40 are bundled by the lens 18, which can, but does not have to, be designed as an achromat, on a common focus area F inside the sample holder 16. A sample container 42, for example in the form of a cuvette, is arranged in the sample holder 16, which contains a sample 44 to be measured.

The sample 44 contains a plurality of particles, so that the light of the s laser beam 38 generates scattered light which travels as an s backscattered light beam 46 at a backscatter angle $\theta$ to the s laser beam and strikes the lens 18 anew. In the present case $\theta=176°\pm2°$. The light of the p laser beam 40 generates scattered light that travels as a p backscattered light beam 48 at the same backscatter angle to the p laser beam 40 and strikes the lens 18.

It is possible, but not necessary, that the s backscattered light beam 46 is guided by means of a first optical fiber 50.1 to the s light intensity detector 22. It is also possible, but not necessary, that the p backscattered light beam 48 is guided by means of a second optical fiber to the p light intensity detector 20.

The p light intensity detector 20 comprises a p polarization filter 54 that only lets through p-polarized light. Correspondingly, the s light intensity detector 22 comprises an s polarization filter 52 that only lets through s-polarized light.

It is possible, but not necessary, for the s backscattered light beam 46 and the p backscattered light beam 48 to be mirrored in the direction of light propagation R behind the lens 18 by a deflection mirror 56 onto an adjustment mirror 58 that deflects at least one of the backscattered laser beams.

The lens 18 can be displaced in the direction of light propagation R by means of a lens adjustment device 60. The optical fiber output 32 can be moved by means of an optical fiber adjustment device 62 in such a way that the laser beam 34 strikes the center of the polarization splitter 14.

The sample holder 16 has a clear width w of more than w=10 mm, for example, so the sample container 42 can be a standard cuvette. It is beneficial, but not necessary, for the sample holder 16 to comprise a water bath 64, so that the sample container 42 can be brought up to a temperature T that can be pre-set. Preferably 0° C.<T<100° C.

FIG. 1 shows that the optical fiber 50.2 is attached to a first holder 64. The first holder 64 can be moved in at least two spatial directions, in the x- and z-direction in the coordinate system shown. Furthermore, the holder 64 is rotatable in at least two angles α and γ. Preferably, the angles α and α are adjustable with an uncertainty of at most 0.1°, in particular 0.025°. Preferably, the x- and z-positions are adjustable with an accuracy of 20 μm, preferably 10 μm, or better. This is done, for example, by means of a plate of the holder 64 that can be moved via two or three fine-thread screws.

The optical fiber 50.2 is attached to a second holder 66. The second holder 66 can be moved in at least two spatial directions, in the y- and z-direction in the coordinate system shown. Furthermore, the second holder 66 is rotatable in at least two angles β and γ. Preferably, the angles β and γ are adjustable with an uncertainty of at most 0.1°, in particular 0.025°. Preferably, the y- and z-positions are adjustable with an accuracy of 20 μm, preferably 10 μm, or better. This is done, for example, by means of a plate of the holder 64 that can be moved via two or three fine-thread screws.

Preferably, the holders 64, 66 are first adjusted so that the s backscattered light beam 46 and the p backscattered light beam 48 have maximum intensity. Then a reference sample 44' is inserted into the sample holder 16 and the holders 64, 66 as well as the mirror 58 are further adjusted so that the maximum cross correlation is achieved.

The first holder 64 and/or the second holder 66 are preferred embodiments independent of other elements of the 3D light scattering particle size distribution measurement device 10.

In other words, the holders 64, 66 are adjusted so that the scatter vectors of the s backscattered light beam 46 and the p backscattered light beam 48 are as similar as possible, ideally identical. Especially scatter vectors of the s backscattered light beam 46 and the p backscattered light beam 48 are as similar as possible with respect to the magnitude and direction.

The optical fiber adjustment device 62 can be moved in at least two spatial directions, in the y- and z-direction in the coordinate system shown. Furthermore, the optical fiber adjustment device 62 is rotatable in at least two angles β and γ. Preferably, the angles β and γ are adjustable with an uncertainty of at most 0.1°, in particular 0.025°. Preferably, they and z positions are adjustable with an accuracy of 20 μm, preferably 10 μm, or better. This is done, for example, by means of a plate of the optical fiber adjustment device 62 movable via two or three fine-thread screws.

Figures 2A, 2B:
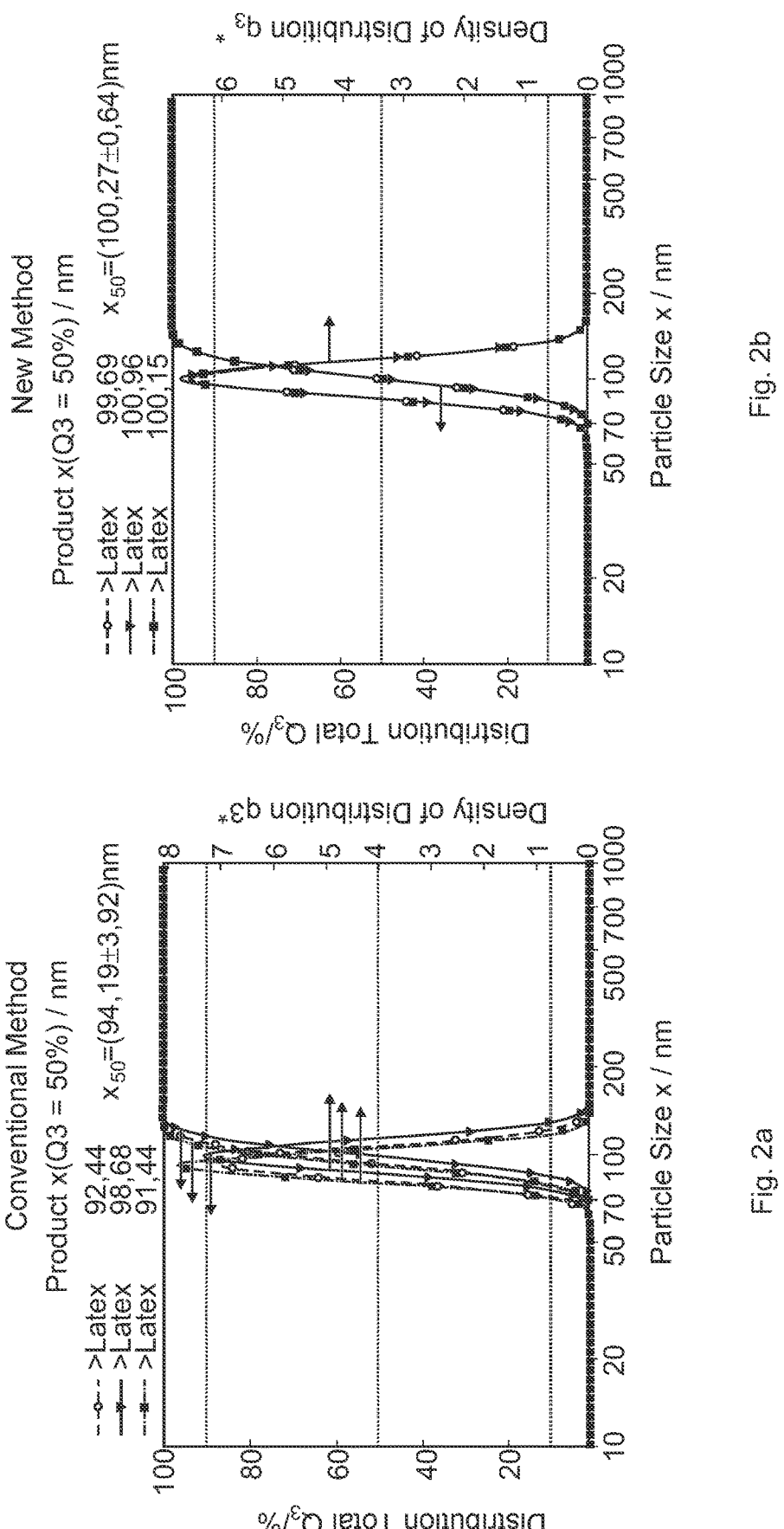

In partial FIG. 2a depicts three measurements on the same sample of 100 nm polystyrene latex particles with a volume concentration of 1%. It should be noted that each of the three measurements produce measurement results that deviate slightly from each other.

Partial FIG. 2b shows three measurements on the same sample with a 3D light scattering particle size distribution measurement device 10 according to the invention. It should be noted that the measured particle size distributions in the form of the particle size distribution density q barely differ from each other. In other words, measurement uncertainty is significantly reduced. With a method according to the prior art, the relative standard deviation is 4.17%; with a method according to the invention, it is 0.64%.

With the method according to the invention, the hydrodynamic median diameter $x_{50}$ was measured at (100.27±0.64) nm and with the method according to the prior art at (94.19±3.92) nm. It should be noted that the multiple scattering has led to the anticipated effect that with the prior art, too small a value is determined, as the sample is a standardized sample with a specific hydrodynamic diameter of (97-103) nm.

The measuring time for the results depicted in the right-hand partial image 2b was 41 seconds; for the left-hand partial image 2a it was 398 seconds. The measuring time is thus 10 times faster with the method according to the invention, while at the same time the repeatability of the measurement results is significantly increased.

Figure 3A:
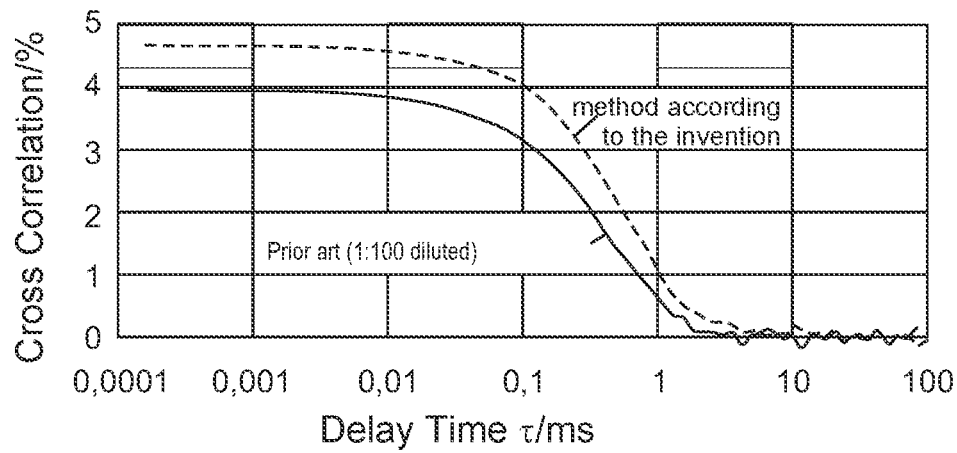

FIG. 3a shows the measured cross-correlation curves of propofol with a concentration of 10 mg/ml. The solid line shows the cross-correlation curve as a function of the delay time τ, which could be measured after a dilution of 1:100 with a method according to the prior art. The dashed line shows the cross-correlation curve during a measurement with the method according to the invention without dilution.

Figure 3B:
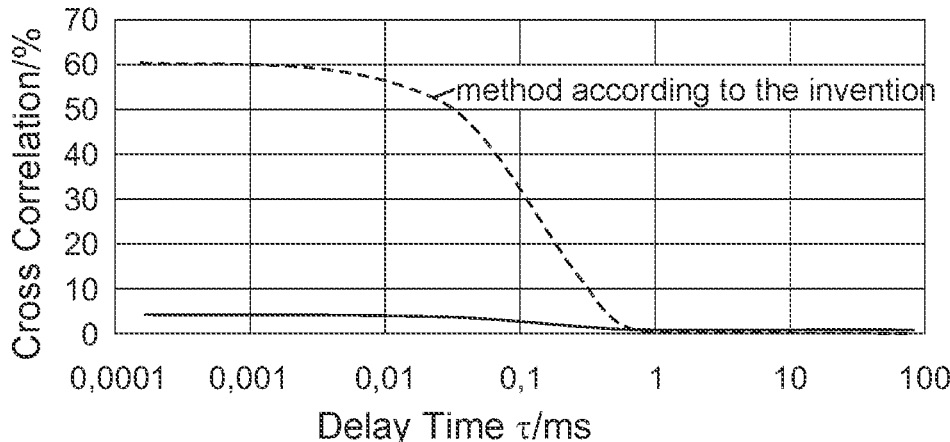

Partial FIG. 3b depicts the cross-correlation curves during measurements on 100 nm polystyrene latex particles. The solid line shows the cross-correlation curve as a function of the delay time τ, which could be measured after a dilution of 1:100 with a method according to the prior art. The dashed line shows the cross-correlation curve during a measurement with the method according to the invention. It should be noted that this is greater than with a method according to the prior art by a factor of approximately 15. This results in a significantly higher signal-to-noise ratio and thus a shorter measuring time with lower measurement uncertainly.

REFERENCE LIST 10 3D light scattering particle size distribution measurement device
12 laser light source
14 polarization splitter
16 sample holder
18 lens
20 p light intensity detector
22 s light intensity detector
24 evaluation unit
26 laser
28 optical fiber
30 optical fiber input
32 optical fiber output
34 laser beam
36 laser intensity adjustment device
38 s laser beam
40 p laser beam
42 sample container, cuvette
44 sample
46 s backscattered light beam
48 p backscattered light beam
50 optical fibers
52 s polarization filter
54 p polarization filter
56 deflection mirror
58 adjustment mirror
60 lens adjustment device
62 optical fiber adjustment device
64 first holder
64 second holder
θ backscatter angle
d beam spacing
F focus area
$M^2$ beam propagation ratio
q particle size distribution density
T temperature $x_{50}$ hydrodynamic median diameter
w width
x spatial coordinate
y spatial coordinate
z spatial coordinate
$\alpha$ angle
$\beta$ angle
$\gamma$ angle

The invention claimed is:

1. A dynamic 3D light scattering particle size distribution measurement device, comprising:
   (a) a laser light source for emitting a laser beam,
   (b) a polarization splitter for generating
      (i) an s laser beam with perpendicular polarization, and
      (ii) a p laser beam with parallel polarization that travels parallel to the s laser beam, wherein the p laser beam is spaced apart from the s laser beam by a beam spacing other than zero,
   (c) a sample holder for holding a sample whose particle size distribution is to be measured,
   (d) a lens that focuses the s laser beam and the p laser beam onto a common focus area inside the sample holder,
   (e) an s light intensity detector for measuring a time-resolved s light intensity, wherein the s light intensity detector
      (i) is arranged to detect an s backscattered light beam from backscattered light of the s laser beam from the focus area,
      (ii) comprises an s-polarisation filter that allows perpendicularly polarized light to pass, resulting in s measuring light, and
      (iii) comprises a light detector for time-resolved intensity measurement of the s measuring light,
   (f) a p light intensity detector for measuring a time-resolved p light intensity, wherein the p light intensity detector
      (i) is arranged to detect a p backscattered light beam from backscattered light of the p laser beam from the focus area,
      (ii) comprises a p polarization filter that allows parallel polarized light to pass, resulting in p measuring light, and
      (iii) comprises a light detector for time-resolved intensity measurement of the p measuring light, and
   (g) an evaluation unit designed to automatically calculate particle size distribution from a time correlation function of the time-resolved p light intensity and the time-resolved s light intensity.

2. The dynamic 3D light scattering particle size distribution measurement device according to claim 1, wherein the p light intensity detector detects the p backscattered light beam at a different location than the s light intensity detector s detects the backscattered light beam.

3. The dynamic 3D light scattering particle size distribution measurement device according to claim 1, wherein the time-resolved intensity measurement of the p measuring light and the time-resolved intensity measurement of the s measuring light used for calculating the particle size distribution are measured at the same time.

4. The dynamic 3D light scattering particle size distribution measurement device according to claim 1, wherein the s light intensity detector and the p light intensity detector are arranged such that the s backscattered light beam and the p backscattered light beam travel from the focus area through the lens respectively to the s light intensity detector and the p light intensity detector.

5. The dynamic 3D light scattering particle size distribution measurement device according to claim 1 wherein
   (a) the laser light source is designed to emit a laser beam with a beam propagation ratio ($M^2$) of at most 1.2 and/or
   (b) the polarization splitter is a polarization beam splitter that has an optical axis and generates two parallel laser beams that are orthogonally polarized to each other.

6. The dynamic 3D light scattering particle size distribution measurement device according to claim 1, wherein
   (a) the laser light source comprises a diode laser and an optical fiber, and
   (b) the optical fiber is a single-mode fiber designed to generate the laser beam with a Gaussian profile with a beam propagation ratio ($M^2$) of at most 1.2.

7. The dynamic 3D light scattering particle size distribution measurement device according to claim 1 wherein
   (a) the sample holder is designed to hold a sample with a diameter of at least 7 mm, and/or
   (b) a sample container is provided in the sample holder.

8. The dynamic 3D light scattering particle size distribution measurement device according to claim 7, wherein the sample container is a cuvette with a diameter of at least 7 mm.

9. A method for determining a particle size distribution of a sample, comprising:
   (a) emitting a laser beam from a laser,
   (b) generating from the laser beam using a polarization splitter
      (i) an s laser beam with perpendicular polarization, and
      (ii) a p laser beam with parallel polarization, wherein the p laser beam travels parallel to the s laser beam and is spaced apart from the s laser beam by a beam spacing other than zero,
   (c) focusing the s laser beam and the p laser beam on a collective focus area inside the sample,
   (d) polarization filtering of light backscattered at a backscatter angle from the focus area by an s polarization filter so that only s polarized light passes, resulting in an s backscattered light beam,
   (e) measuring a time-resolved s light intensity of the s backscattered light beam,
   (f) polarization filtering of light backscattered at a backscatter angle from the focus area by a p polarization filter so that only p polarized light passes, resulting in a p backscattered light beam,
   (g) measuring a time-resolved p light intensity of the p backscattered light beam, and
   (h) calculating the particle size distribution by time correlating the time-resolved p light intensity and the time-resolved s light intensity.

10. The method according to claim 9 wherein the backscatter angle is at least 165°.

11. The method according to claim 9 wherein the focus area is spaced apart from a cuvette wall by at least 0.3 mm.

12. The method according to claim 11 wherein the focus area is spaced apart from the cuvette wall by 0.5 mm.

13. The method according to claim 9 wherein the sample is contained in a cuvette with a diameter of at least 0.5 mm.

14. The method according to claim 9 wherein the focus area is spaced apart from a point of incidence at which the laser beam enters the sample container by at most 2 mm.

15. The method according to claim 14 wherein the focus areas is spaced apart from the point of incidence by at most 1 mm.

16. The method according to claim 9, wherein the particle size distribution is calculated by cross-correlating the time-resolved p light intensity and the time-resolved s light intensity.

17. The dynamic 3D light scattering particle size distribution measurement device according to claim 1 wherein the evaluation unit is set up to automatically calculate a cross-correlation of the time-resolved p light intensity and the time-resolved s light intensity and to automatically calculate the particle size distribution from the cross-correlation.

* * * * *